Oct. 21, 1941.  M. A. MIKESH  2,260,259

DISPENSING DEVICE

Filed April 6, 1940

INVENTOR
MARTIN A. MIKESH
BY Virgil F. Davies
ATTORNEY

Patented Oct. 21, 1941

2,260,259

UNITED STATES PATENT OFFICE 2,260,259

DISPENSING DEVICE

Martin A. Mikesh, Lawrenceville, N. J., assignor to The M. W. Kellogg Co., New York, N. Y., a corporation of Delaware Application April 6, 1940, Serial No 328,336

7 Claims. (Cl. 221—108)

This invention relates in general to metering devices for use in the electrical fusion of metals and is in the nature of an improvement of the metering devices of Patent No. 2,174,175.

It is an object of this invention to provide a metering device of the character mentioned, of improved and simplified construction, which includes a minimum of moving parts subject to wear and which is capable of long and uninterrupted accurate operation without necessitating shut-downs for repair or replacement of parts.

Figure 2:
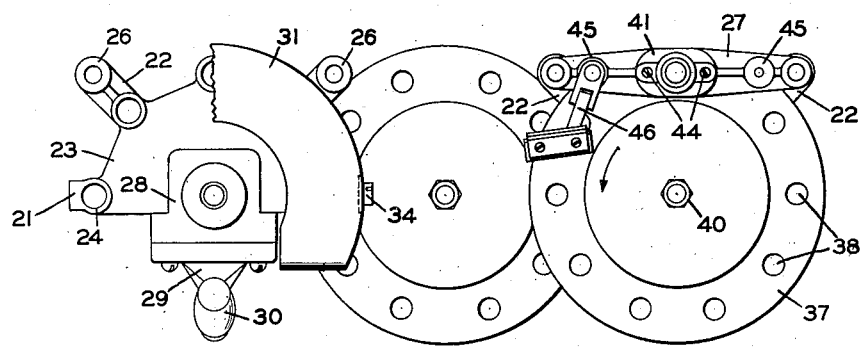
Figure 3:
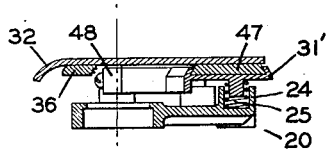
Figure 1:
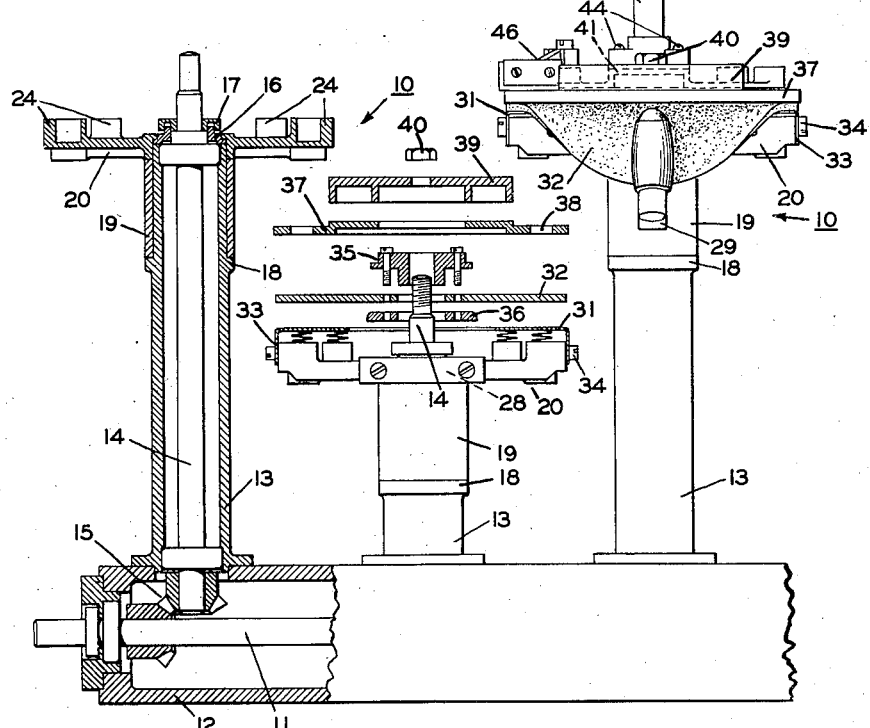

The further objects and advantages of the invention will be apparent from a consideration of the following description of a preferred embodiment thereof taken with the accompanying drawing, in which, Fig. 1 is a fragmentary front elevation, partly in section and partly exploded, showing the novel metering device in various stages of assembly, Fig. 2 is a plan view also showing the novel device in various stages of assembly, and Fig. 3 is a fragmentary sectional view of a modified detail of the novel device.

The metering device of the invention, while of general application, is particularly adapted for use in the electrical fusion of metals, wherein granular materials in the form of alloys such as ferro-chrome, ferro-manganese, etc., or pure metals such as nickel, cobalt, etc., are supplied at controlled rates to the current discharge gap through a hollow electrode, as disclosed in the U. S. Patent No. 2,174,175 above mentioned. While one or a plurality of the metering devices 10 may be used as required by the particular installation, three such devices have been shown as by so doing the number of figures required for a complete showing have been materially reduced. The arrangement shown also serves to illustrate the manner in which the metering devices, because of their simplified construction can be nested to conserve space and to simplify the design of the machine of which they became a part.

As shown, particularly in Fig. 1, metering devices 10 are arranged to be driven from the same power source; this showing is merely illustrative as the metering devices may be individually driven or grouped in any manner to be driven in any preferred way.

Drive shaft 11 is mounted for rotation in tubular housing 12 upon which are supported, in registry with appropriate holes, tubular standards 13. Standards 13 may be of different lengths as shown so that devices 10 may be nested and thus reduce the required length of housing 12. Aside from the length of standards 13 metering devices 10 are of identical construction so that a description of one of them will suffice for all.

A shaft 14 is mounted in bearings in standard 13 to be driven as through bevel gears 15 by shaft 11. On the top of standard 13 is provided a cover plate 16 shaped to accommodate a cap 17 which encircles shaft 14 and closes the top end of standard 13 to the ingress of particles of the material handled.

Standard 13 includes an enlarged portion 18 provided with a shoulder for the support of a sleeve 19 that encircles standard 13. A casting 20 is supported, concentrically with shaft 14 on the shoulders provided by the top of sleeve 19 and by cover plate 16.

Casting 20, Figs. 1 and 2, is made up of a plurality of equally spaced radially extending portions 21 and 22 that are connected by webs 23. Three portions 21 and two portions 22 are provided. Portions 21 include cup like bosses 24 into which seat springs 25. Portions 22 also include cup like bosses 24 into which springs 25 seat, but in addition, include bosses 26 which are tapped to receive screws for mounting member 27. Casting 20 also includes a central block 28 that supports bracket 29. Disc bending roller 30 is mounted for rotation on bracket 29.

A U-shaped guide shoe 31 rests on springs 25. This shoe is flat except for its end portions which are curved downwardly away from the path of flexible disc 32. Shoe 31 includes depending tabs 33 that pass over the portions 21 nearest to bracket 29. Screws 34 pass through slotted holes in tabs 33 and screw into portions 21 to position shoe 31 for a limited vertical movement.

Flexible disc 32 is mounted between member 35 and ring 36 by screws; the arrangement is such that disc 32 rotates with shaft 14. Roller 30 in operation maintains disc 32 bent, as indicated, from the edge of ring 36 outwardly. Disc 32 may be of any flexible material suited for the purpose; at present, rubber is the preferred material but cloth, or rubber covered cloth, or similar material, may be used.

A metering disc 37 is adapted to contact the top surface of flexible disc 32. Disc 37 includes a plurality of holes 38 into which the material to be metered is passed. Each metering device 10 is provided with a plurality of spare metering discs. These spare discs may be of different thickness, or may have metering holes of different size, or may have a different number of metering holes. Thus, with a proper selection of spare discs each metering device 10 is capable of a wide range of metering rates. With any particular disc a variation in metering rate may be had by changing the speed of rotation of shaft 14. The inner portion of disc 37 is covered by a cap 39. A nut 40 screws on the end of shaft 14 and applies the pressure to tighten the assembly as required to have discs 32 and 37 rotate as a unit with shaft 14.

Member 27, which is supported on portions 22, straddles the path of holes 38 in disc 37. At the middle of member 27 is an enlargement 41 in which is formed a chamber that opens at its bottom over the path of holes 38. Into this chamber opens tube 42 through which the granular material passes from supply hopper 43. The chamber is made sufficiently large to assure complete filling of holes 38 at any contemplated speed of rotation of disc 37. To prevent the free flow of material onto the imperforate surface of disc 37 the sides of the chamber are lined with a metal backed rubber member which can be raised and lowered by screws 44 to contact it as required with the surface of disc 37. Member 27 is provided with two threaded bosses 45 upon one or the other of which, depending on the direction of rotation of disc 37, is mounted a pivoted wiper member 46.

The metering device 10, as just described, has been found satisfactory in use, however, in special cases where operating conditions were extremely severe the life of the flexible disc was lengthened and the operation improved by substituting the arrangement of Fig. 3 for the guide shoe 31 of Figs. 1 and 2.

As shown in Fig. 3 a casting 31' is provided in place of shoe 31 of the other figures. Casting 31' is formed to hold an inset member 47 upon which the under surface of flexible disc 32 is adapted to ride. Member 47 is made of soapstone, or similar self-lubricating material, and offers a minimum resistance to the movement of flexible disc 32 thereon. This, of course, reduces wear of disc 32 and renders the operation more satisfactory. Member 47 is held in place in its groove by stop pieces 48 that are removably fastened to the ends of casting 31'.

In the operation of the metering device the granular material passes from supply hopper 43 through tube 42 and the chamber in enlargement 41 onto the surface of disc 37. As disc 37 rotates holes 38 will successively pass under enlargement 41 and be filled with the granular material, the metal backed rubber member in the chamber of the enlargement prevents excessive overfilling of holes 38 and the passage of the granular material, in substantial quantities, to the imperforate portions of disc 37. As the filled holes pass under wiper 46 any excess granular material is wiped off and falls into a hopper, not shown, from whence it may be returned to supply hopper 43. As holes 38 pass into the zone where the bending of flexible disc 32 occurs, flexible disc 32 moves away from disc 37 and opens the bottom of holes 38 to dump the material therein for conveyance to the ultimate point of use.

I claim:

1. A metering device adapted to convey material at a predetermined rate from a point of supply to a point of discharge, which comprises, a metering disc having a plurality of holes extending therethrough, means for rotating said disc to carry said holes from the point of material supply to the point of discharge, a deformable disc mounted for rotation with said metering disc and adapted to contact the bottom of said metering disc to close the bottom of said holes, and means for bending said deformable disc away from and out of contact with the bottom of said metering disc at the point of discharge to open the bottom of said holes.

2. A metering device adapted to convey material at a predetermined rate from a point of supply to a point of discharge, which comprises, a metering disc having a plurality of holes extending therethrough, means for rotating said disc to carry said holes from the point of material supply to the point of discharge, a deformable disc mounted for rotation with said metering disc and adapted to contact the bottom of said metering disc to close the bottom of said holes, a shoe maintained against said deformable disc provided with a surface adapted to bear against the bottom of said deformable disc from the point of material supply to substantially the point of discharge, and means for deforming said deformable disc to move it away from said metering disc at the point of discharge to open the bottom of the holes in said metering disc.

3. A metering device adapted to convey material at a predetermined rate from a point of supply to a point of discharge, which comprises, a metering disc having a plurality of holes extending therethrough, means for rotating said disc to carry said holes from the point of material supply to the point of discharge, a deformable disc mounted for rotation with said metering disc and adapted to contact the bottom of said metering disc to close the bottom of said holes, a non-rotatable resiliently mounted shoe adapted to bear against said deformable disc to maintain said discs in contact with each other, said shoe including a surface disposed parallel to the bottom surface of said metering disc extending from the point of material supply to substantially the point of discharge, means at the material source preventing substantial overfilling of said holes and uncontrolled passage of the material to the surface of the metering disc, means riding on the top surface of said metering disc adapted to wipe excess material off the top surface of said metering disc, and means angularly disposed to the bottom surface of said metering disc adapted to deform said deformable disc to remove it from contact with the metering disc at the point of discharge.

4. A metering device including a stand, a shaft mounted for rotation in said stand, a non-rotatable support member mounted on said stand, said support member including a plurality of cup like bosses, springs in said bosses, a shoe positioned on said springs for limited vertical movement relative to said support member, said shoe including a flat semi-annular body portion, a flexible disc mounted for rotation with said shaft and adapted to ride on said semi-annular body portion, a metering disc having a plurality of spaced material receiving holes therethrough mounted for rotation with said flexible disc and adapted to bear on said flexible disc, pressure applying means for maintaining said discs in contact with each other and with said shoe, a bracket mounted on said support member between the ends of said semi-annular body portion and a roller mounted on said bracket and angularly disposed relative to said metering disc, said roller being adapted to ride on the top surface of said flexible disc to bend it out of contact with said metering disc to open the bottom of said holes for discharge of the material in said holes.

5. A metering device including a stand, a shaft mounted for rotation in said stand, a non-rotatable support member mounted on said stand, said support member including a plurality of cup-like bosses, resilient means in said bosses, a shoe positioned on said resilient means for limited vertical movement relative said support member, said shoe including a flat semi-annular body portion formed of self-lubricating material, a flexible disc mounted for rotation with said shaft and adapted to ride on said body portion, a metering disc having a plurality of spaced material receiving holes therethrough mounted for rotation with said shaft and adapted to bear on said flexible disc, pressure applying means for maintaining said discs in contact with each other and with said flat body portion throughout the extent of said body portion, a bracket mounted on said support member between the ends of said semi-annular body portion, and a roller angularly disposed relative to said metering disc mounted on said bracket, said roller being adapted to ride on said flexible disc to remove it from contact with said metering disc to open the bottom of said holes.

6. A metering device including a stand; a shaft mounted for rotation in said stand; a non-rotatable support member mounted on said stand concentrically with said shaft; said support member including a plurality of cup-like bosses equally spaced apart on a semi-circle concentric with said shaft and a pair of radially extending arms equally spaced from the median line of the semi-circle; springs in said bosses; a shoe positioned on said springs and fastened to said support member for limited vertical movement relative thereto; said shoe including a flat semi-annular body portion concentric with said semi-circle; a flexible disc mounted for rotation on said shaft and adapted to ride on said shoe; a metering disc mounted for rotation on said shaft, said disc being provided with spaced holes therethrough; pressure applying means for maintaining said discs in contact with each other and with said body portion of said shoe; a bracket mounted on said support member between the ends of said body portion; a roller angularly disposed relative to said metering disc mounted on said bracket; said roller being adapted to ride on the top surface of said flexible disc to remove said flexible disc out of contact with said metering disc; a member mounted on said pair of radially extending arms to straddle the perforate portion of said metering disc; said member including a chamber, opened at its top and at its bottom, overlying the path of the holes in said metering disc; adjustable means in said chamber adapted to prevent free flow of material from said chamber onto the surface of the metering disc; said member having a pair of bosses equally spaced from its middle; and a wiper member mounted on one or the other of said bosses adapted to wipe excess material from the surface of said metering disc.

7. A metering device adapted to convey material at a predetermined rate from a point of supply to a point of discharge, which comprises, a metering member having a plurality of holes therethrough, means for moving said metering member to carry said holes from the point of material supply to the point of material discharge, a continuous deformable member mounted for movement with said metering member and adapted to contact the bottom of said metering member to close the bottom of said holes, and means for deforming said deformable member out of contact with the bottom of said metering member at the point of material discharge.

MARTIN A. MIKESH